(12) United States Patent
Kabasakalian et al.

(10) Patent No.: US 6,775,683 B2
(45) Date of Patent: Aug. 10, 2004

(54) METHOD AND SYSTEM FOR PERFORMING PROCESSING DATA

(75) Inventors: Gregory J. Kabasakalian, Ridgefield, CT (US); Ajay Poddar, Morristown, NJ (US); Rajnish Kapur, New Delhi (IN)

(73) Assignee: GE Financial Assurance Holdings, Inc., Richmond, VA (US)

( * ) Notice: Subject to any disclaimer, the term of this patent is extended or adjusted under 35 U.S.C. 154(b) by 326 days.

(21) Appl. No.: 09/683,142

(22) Filed: Nov. 27, 2001

(65) Prior Publication Data

US 2003/0105752 A1 Jun. 5, 2003

(51) Int. Cl.$^7$ ............................................. G06F 17/30
(52) U.S. Cl. ............................. 707/200; 707/1; 707/4; 707/104.1
(58) Field of Search ................. 707/514, 10, 103 R, 707/100, 203, 6, 1, 4, 104.1, 200; 701/208; 705/7

(56) References Cited

U.S. PATENT DOCUMENTS

| | | | | |
|---|---|---|---|---|
| 5,201,046 A | * | 4/1993 | Goldberg et al. | 707/100 |
| 5,758,150 A | * | 5/1998 | Bell et al. | 707/10 |
| 5,970,490 A | * | 10/1999 | Morgenstern | 707/10 |
| 6,148,298 A | | 11/2000 | LaStrange et al. | |
| 6,148,308 A | | 11/2000 | Neubauer et al. | |
| 6,381,600 B1 | * | 4/2002 | Lau | 707/6 |
| 6,502,098 B2 | * | 12/2002 | Lau | 707/100 |
| 6,604,046 B1 | * | 8/2003 | Van Watermulen et al. | 701/208 |
| 2001/0037228 A1 | * | 11/2001 | Ito et al. | 705/7 |
| 2002/0013790 A1 | * | 1/2002 | Vandersluis | 707/514 |
| 2002/0116389 A1 | * | 8/2002 | Chen et al. | 707/103 R |
| 2002/0133510 A1 | * | 9/2002 | Lau | 707/203 |
| 2003/0204517 A1 | * | 10/2003 | Skinner et al. | 707/100 |

OTHER PUBLICATIONS

Blackstone et al., Using Data Commander for Data Migration or transformation, 1999 Blackstone & Cullen, Inc., pp. 1–13.*
McCain et al., Relay Database Design, IEEE, 1995, pp. 16–20.*
Templeton, Metadata Challenges in Federating Databases, IEEE, 1996, pp. 1–15.*
Relativity Technology, RescueWare, 1998, pp. 1–9.*
Critchlow et al., Meta–data Based Mediator Generation, pp. 1–9.*
Rajinikanth et al., Multiple Database Integration in CALIDA: Design and Implementation, IEEE, 1990, pp. 378–384.*
A.H. Reisner, Australia's National Genomic Information System, IEEE, 1993, pp., 595–602.*
Jadav et al., Caching of Large Database Objects in Web Servers, IEEE, 1997, pp. 10–19.*
Chen et al., Constructing and Maintaining Scientific Database Views in the Framework of the Object–Protocol Model, IEEE, pp. 237–248.*

* cited by examiner

*Primary Examiner*—Frantz Coby
(74) *Attorney, Agent, or Firm*—Hunton & Williams LLP

(57) ABSTRACT

The invention provides a system and method for processing flat files for use in a relational database. The invention includes inputting a plurality of flat files wherein each of the flat files contains data. A parameters file is accessed to obtain processing parameters contained in the parameters file. The data in the flat files are checked based on the processing parameters. Thereafter, a logical record is assembled by processing the data in the flat files based on the processing parameters. An output file is generated. The output file contains the logical record and a portion of the data.

31 Claims, 10 Drawing Sheets

METHOD AND SYSTEM FOR PERFORMING PROCESSING DATA

BACKGROUND OF THE INVENTION

The invention is directed to a method and system for processing data in order to input data contained in flat files into a relational database.

In the open markets, including mutual fund transactions and trades, substantial amounts of data are often collected by one entity and thereafter communicated to other entities for further processing. Illustratively, the collection entity gathers data regarding trades, purchases or sales and stores this data on a very large mainframe system. At a predetermined time in each business day, the data is downloaded to the secondary entity.

The files that are stored on the mainframe computer of the collection agency are large text files, and specifically what are characterized as "flat files." A flat file is a data file that does not possess any linkages to another file and is not related to another file in any manner. A flat file is commonly used for stand-alone lists. Accordingly, there is commonly no relationship between these flat files nor the records and fields contained in those flat files. By the nature of the flat files, including the layout of the flat files and the data contained in the flat files, it is not possible to effectively utilize the information contained therein. As a result, it is necessary to preprocess the flat files into a relational database. In other words, it is necessary to map the contents of the flat file into a relational database. A relational database is a method of providing a database organization that links files together as is necessary or desired. A relational database system has the ability to create relationships between various files by comparing data in those files. Illustratively, a relational database system has the capability to process two or more files in such a manner that new files are created based on the prior relational files that match requested criteria. Accordingly, it should be appreciated that queries often involve more than one data file. Further, SQL or Structured Query Language, is a language that is used by systems to communicate with a relational database. That is, an operator can create a query using SQL. By using the query, the user requests specific information from within a relational database.

However, it should be appreciated that the layout and content of the flat files may often vary depending on the collecting entity. Further, even with one company for example, that company may change the layout of their flat files for a variety of reasons. The receiving entity must then rework the manner used to process the flat files. Using known techniques, this reformatting causes substantial problems in that the programs utilized to convert the flat files into a relational database are not easily changed. Often, these programs are hard coded. Accordingly, once the format of the incoming flat files is varied, the entire program must again be revised and thereafter recompiled. Accordingly, a need is present to afford enhanced adjustability to deal with the varied layout of flat files, and the processing of these flat files into a relational database.

BRIEF SUMMARY OF THE INVENTION

Thus, there is a particular need for processing flat files for inclusion of the data contained therein in a relational database. Accordingly, the invention provides a system and method for processing flat files for use in a relational database. The invention includes inputting a plurality of flat files wherein each of the flat files contains data. A parameters file is accessed to obtain processing parameters contained in the parameters file. The data in the flat files are checked based on the processing parameters. Thereafter, a logical record is assembled by processing the data in the flat files based on the processing parameters. An output file is generated. The output file contains the logical record and the data obtained from the flat files.

In one aspect of the invention, a method provides for processing flat files for use in a relational database, the method comprising inputting a plurality of flat files, each of the flat files containing data; providing a parameters file containing processing parameters; changing at least one of the processing parameters in the parameters file; accessing the parameters file to obtain the processing parameters, the processing parameters including mandatory file details and optional file details; checking the data in the plurality of the flat files based on the processing parameters, the checking including determining if mandatory files are present based on the mandatory file details and determining if optional files are present based on the optional file details, wherein if all mandatory files are not present, then, the method further including waiting for a predetermined time period and rechecking for the mandatory files; assembling a logical record by processing the data in the flat files based on the processing parameters; and generating an output file, the output file containing the logical record and a portion of the data.

In a further aspect of the invention, a system is provided for processing flat files for use in a relational database, the system comprising an input portion that inputs a plurality of flat files, each of the flat files containing data; a parameters file access portion that accesses a parameters file to obtain processing parameters, the parameters file containing the processing parameters; a data checking portion that checks the data in a plurality of the flat files based on the processing parameters; a logical record generation portion that assembles a logical record by processing the data in the flat files based on the processing parameters; and an output file generation portion that generates an output file, the output file containing the logical record and a portion of the data.

In a further aspect of the invention, a system is provided for processing flat files for use in a relational database, the system comprising an input portion that inputs a plurality of flat files, each of the flat files containing data; a parameters file memory that contains a parameters file, the parameters file containing processing parameters, the processing parameters including mandatory file details and optional file details; a parameters file access portion that accesses the parameters file to obtain processing parameters, the parameters file access portion providing for a user of the system to change the processing parameters; a data checking portion that checks the data in a plurality of the flat files based on the processing parameters, the data checking portion checking if mandatory files are present based on the mandatory file details and checking if optional files are present based on the optional file details; a logical record generation portion that assembles a logical record by processing the data in the flat files based on the processing parameters; and an output file generation portion that generates an output file, the output file containing the logical record and a portion of the data.

In a further aspect of the invention, a system is provided for processing flat files for use in a relational database, the system comprising means for inputting a plurality of flat files, each of the flat files containing data; means for accessing a parameters file to obtain processing parameters, the parameters file containing the processing parameters;

means for checking the data in a plurality of the flat files based on the processing parameters; means for assembling a logical record by processing the data in the flat files based on the processing parameters; and means for generating an output file, the output file containing the logical record and a portion of the data.

In a further aspect of the invention, a system is provided for processing flat files for use in a relational database, the system comprising means for inputting a plurality of flat files, each of the flat files containing data; means for providing a parameters file containing processing parameters; means for changing at least one of the processing parameters in the parameters file; means for accessing the parameters file to obtain the processing parameters, the processing parameters including mandatory file details and optional file details; means for checking the data in the plurality of the flat files based on the processing parameters, the checking including determining if mandatory files are present based on the mandatory file details and determining if optional files are present based on the optional file details, wherein if all mandatory files are not present, then, the method further including waiting for a predetermined time period and rechecking for the mandatory files; means for assembling a logical record by processing the data in the flat files based on the processing parameters; and means for generating an output file, the output file containing the logical record and a portion of the data.

BRIEF DESCRIPTION OF THE DRAWINGS

The present invention can be more fully understood by reading the following detailed description of presently-preferred embodiments together with the accompanying drawings, in which like reference indicators are used to designate like elements, and in which.

DETAILED DESCRIPTION OF THE INVENTION

Figure 1:
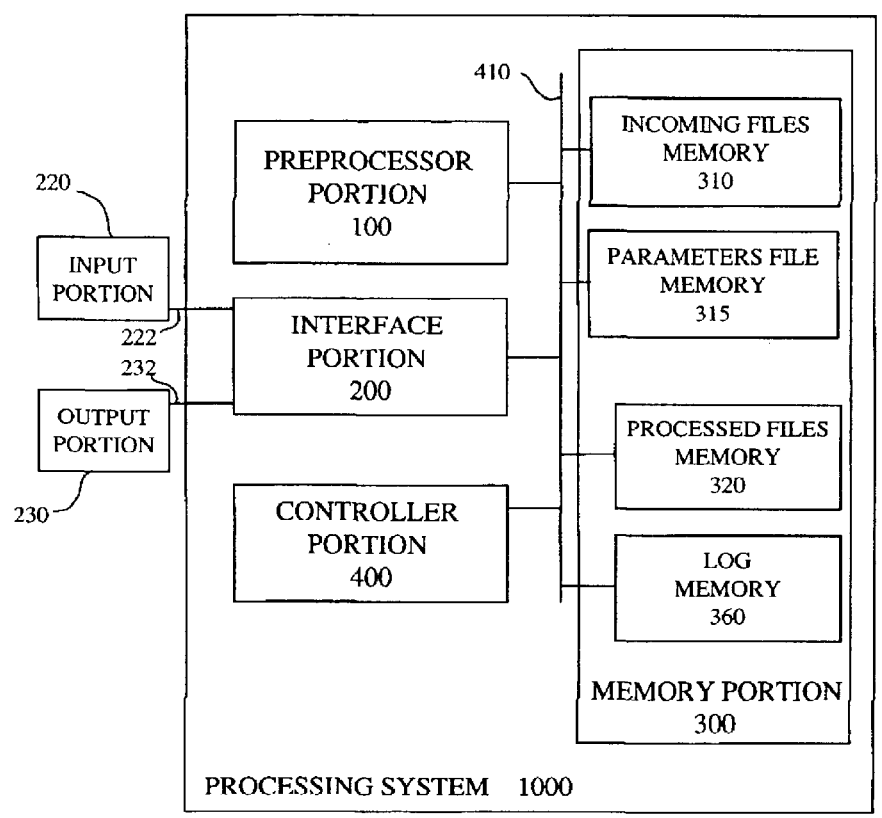
FIG. 1 is a block diagram showing an illustrative processing system in accordance with one embodiment of the method and system of the invention.

In accordance with one embodiment of the invention, FIG. 1 is a block diagram showing an exemplary processing system 1000. The processing system 1000 receives and processes data in accordance with embodiments of the invention. As shown in FIG. 1, the processing system 1000 includes a preprocessor portion 100, an interface portion 200, a memory portion 300 and a controller portion 400. The preprocessor portion 100, the interface portion 200, the memory portion 300 and the controller portion 400 are all connected utilizing a databus 410. The processing system 1000 receives and processes data in accordance with embodiments of the method and system of the invention, as is described in detail below.

The preprocessor portion 100 performs preprocessing of incoming flat files containing data. The preprocessor portion 100 checks the input files for various attributes. Thereafter, the preprocessor portion 100 prepares and loads the data into a relational database.

The interface portion 200 provides an interface for the processing system 1000 such that the processing system 1000 can input and output data. Specifically, the interface portion 200 works in conjunction with the input portion 220 via a link 222. The input portion 220 inputs data in any suitable manner. The interface portion 200 works in conjunction with the output portion 230 via a link 232. The output portion 230 outputs data in any suitable manner.

As shown in FIG. 1, the processing system 1000 includes the memory portion 300. The memory portion 300 stores a variety of data. The memory portion 300 includes an incoming files memory 310, a parameters file memory 315, a processed files memory 320, and a log memory 360. The incoming files memory 310 stores flat files after being input into the processing system 1000. The parameters file memory 315 stores a parameters file, which is used in the processing of the input files. The processed files memory 320 stores processed data, as is described below. Further, the log memory 360 stores a log, which documents the activities of the preprocessor portion 100.

The processing system 1000 also includes the controller portion 400. The controller portion 400 manages general operations of the processing system 1000. For example, the controller portion 400 may control back-up and recovery operations, virus protection, and network communications as well as the overall operation of the processing system 1000. Also, the controller portion 400 invokes operation of the preprocessor portion 100 in accordance with embodiments of the method and system of the invention.

Figure 2:
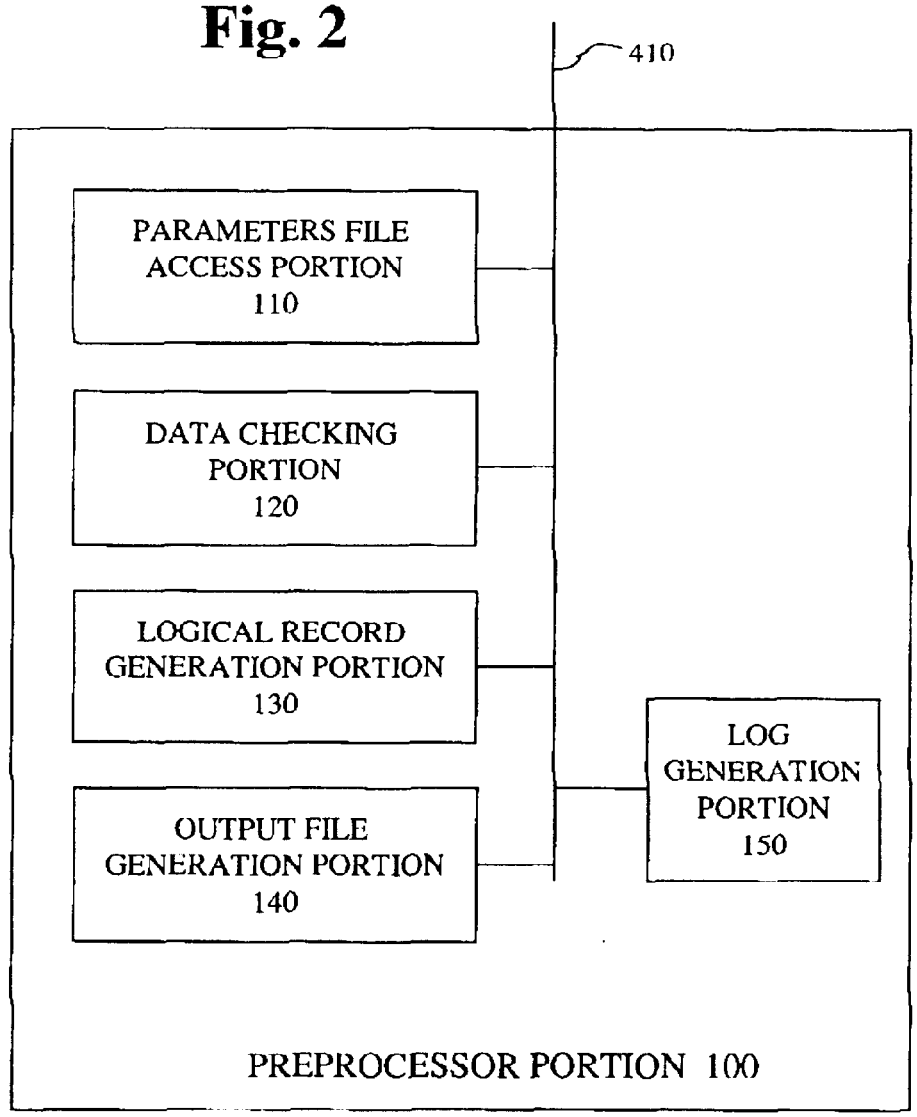
FIG. 2 is a block diagram showing the preprocessor portion of FIG. 1 in further detail in accordance with an embodiment of the method and system of the invention.

FIG. 2 is a block diagram showing the preprocessor portion 100 in further detail. As shown in FIG. 2, the preprocessor portion 100 includes a parameters file access portion 110, a data checking portion 120, a logical record generation portion 130, an output file generation portion 140, and a log generation portion 150. Each of the data checking portion 120, the logical record generation portion 130, the output file generation portion 140, and the log generation portion 150 are connected to each other, and to the other components of the processing system 1000, by the databus 410.

The components of the preprocessor portion 100 perform various operations not otherwise handled by the preprocessor portion 100. Specifically, the parameters file access portion 110 performs operations relating to access of the parameters file in the parameters file memory 315. The data checking portion 120 performs various operations relating to checking of the input files. The logical record generation portion 130 performs various operations relating to assembly of the logical record using the input files. Further, the output file generation portion 140 performs various operations relating to outputting the data of the input records into a relational database. The log generation portion 150 performs various operations relating to generation of a log to document the activities of the preprocessor portion 100.

It should be appreciated that the processing system 1000 may be utilized to process a wide variety of data contained in flat files to relational database files. However, for illustrative purposes the invention will hereinafter be described in terms of the processing of mutual funds data. The processing system 1000 receives data from a source in the form of sequential files. The sequential files are flat files. The flat files may be in a variety of formats. For example, the flat files may be in the form of Excel files, Access files, or Focus flat files. Illustratively, these files may be broken into categories. Specifically, the files might include financial activity files, word processing files, and account position files.

The incoming data files are received via the input portion 220. In summary, once received, the flat files are reformatted and combined by category in accordance with one embodiment of the invention. In accordance with one embodiment of the invention, each category of data is associated with a particular record format which may be denoted by a three character identification (ID). For example, financial activity is defined as RC1 format. An order processing file is defined as RC2 format. Further, an account position file is defined as RC3 format. Illustratively, financial activity files and order processing files are aggregated on a month-to-date and year-to-date basis and kept in sequential file format. On the other hand, account position data are held in a sequential file format on a daily basis, but aggregated monthly into year-to-date focus database of daily balances.

As described in further detail below, the processing system 1000 provides a wide variety of time-based reports based in the data contained in the incoming flat files. Specifically, the processing system 1000 includes daily, weekly, monthly, quarterly and yearly reports, for example. The processing system 1000 is driven by a variable known as the PROCDATE (Processing Date) which is derived from the incoming files. This PROCDATE is the date on which incoming transactions are processed and for normal operations is equivalent to the previous business day.

Hereinafter, further aspects of processing of the incoming files will be described. The incoming files are input utilizing the input portion 220 and the interface portion 200, as shown in FIG. 1. Once the files are input, the controller portion 400 places the files in the incoming file memory 310. For example, the files might be received from the National Finance Data Service (NFDS). The incoming files may be transmitted from NFDS to the processing system 1000 in any suitable manner such as over the Internet or over a network.

The files that are received from NFDS are in the form of TIP (Transmission Interface Package) file formats, for example. These files are flat sequential files with multiple physical records making up a single logical record. Therefore, it is necessary to preprocess these flat sequential files. It is also necessary to perform validation processes on these files. It should be appreciated that any suitable validation process may be utilized in conjunction with the preprocessing of the present invention.

Both preprocessing and validation are performed prior to upload of the data into the database in accordance with one embodiment of the method and system of the invention. Specifically, the processed files may be uploaded to a database using a Structured Query Language (SQL) loader. The preprocessing and validation of the files will maximize efficiency of the loader and improve performance. In accordance with one embodiment of the method of the invention, the data is loaded in two steps. First, the pre-processed files may be loaded to their respective shadow tables. These tables might include:

TB-SHADOW-DFA;

TB-SHADOW-OPA; and

TB-SHADOW-APA.

The controller portion 400 loads the preprocessed files into their respective shadow tables without doing any cross-reference validations. Upon successful load, the data is transferred to working tables, where the data is stored for general use. Each transaction is validated and an exception report generated if the validation fails. As described above, these validations may be performed utilizing any suitable validation process.

Hereinafter aspects of the invention will be described in further detail. With reference to FIG. 1, the preprocessor portion 100 performs the preprocessing of the incoming data. In summary, the preprocessor portion 100 may be in the form of an executable program that looks for the input files in the specified folder in the incoming file memory 310. The preprocessor portion 100 performs a series of conversions and produces output files. Then, for example, an SQL loader uses the produced output files to upload to the database. Once the output file is produced by the preprocessor portion 100, the control portion 400 starts the SQL loader to upload the files into respective shadow tables.

In the method of the invention, the preprocessor portion 100 utilizes a parameters file. The parameters file contains operative and configuration parameters. Illustratively, the parameters file may be in the form of an initialization (INI) file or other type of definition file. The format and use of the parameters file is described in detail below.

Figure 3:
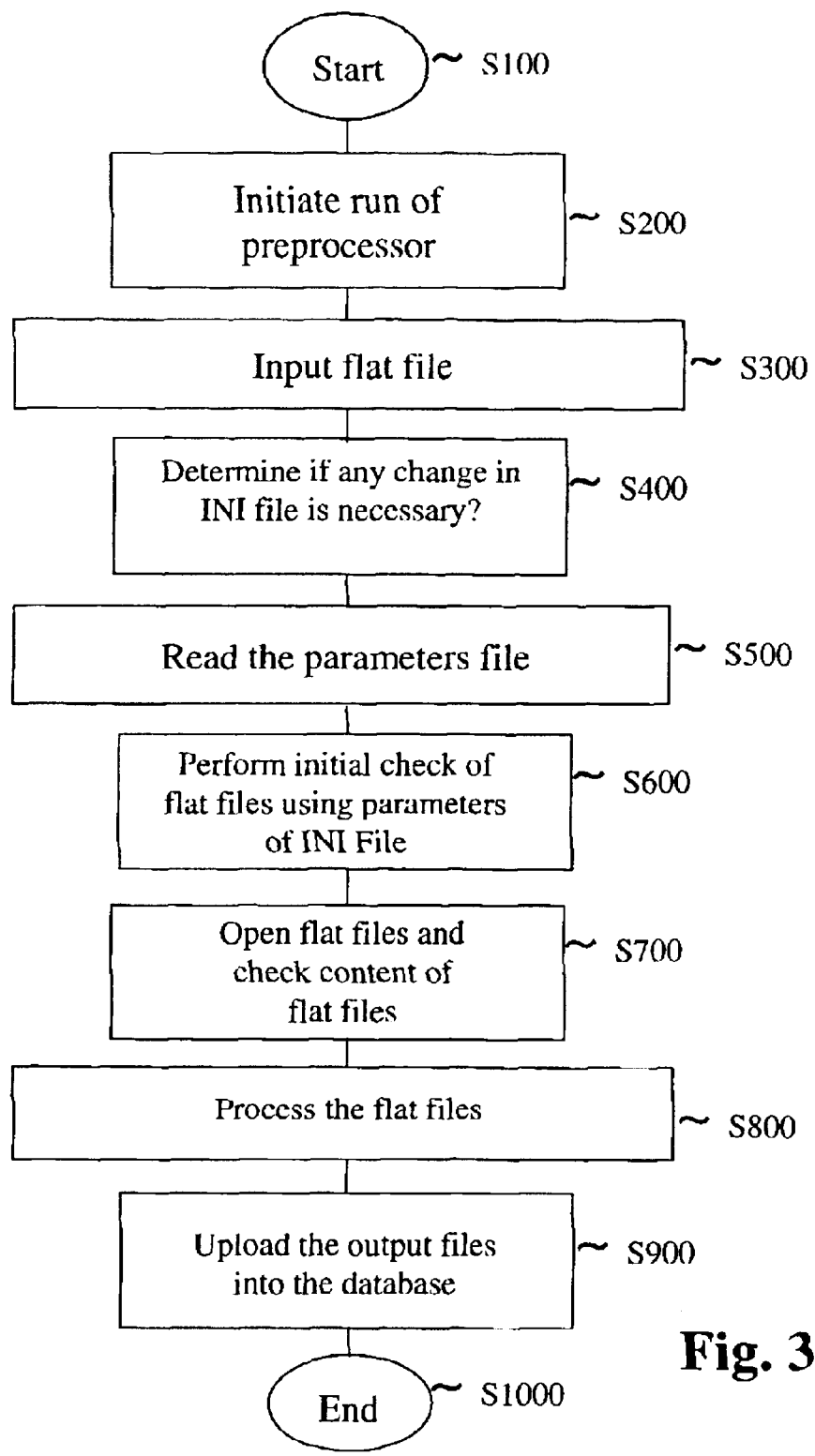
FIG. 3 is a high-level flow chart illustrating preprocessing of files in accordance with one embodiment of the method and system of the invention.

FIGS. 3–10 are flow charts illustrating operation of the preprocessor portion 100 in accordance with one embodiment of the invention. FIG. 3 is a high level flowchart showing the overall operation of the preprocessor portion 100. As shown in FIG. 3, the preprocessing is initiated in step S100. In step 200, the controller portion 400 initiates the run of the preprocessor portion 100. Then, in step S300, the flat files are input utilizing the input portion 220 and the interface portion 200. The input file is placed into a predetermined position in the incoming file memory 310. Then the process passes to step S400. In step S400, the preprocessor portion 100, as described in further detail below, determines if any change in the parameters file is necessary. If no changes are necessary in the parameters file, then the preprocessor portion 100 retrieves and reads the parameters file in step S500.

In step 600, the preprocessor portion 100 performs an initial check of the flat files stored in the incoming file memory 310. This initial check by the preprocessor portion 100 is performed using the parameters contained in the parameters file. Once the initial check is performed, the process passes to step S700. In step S700, the preprocessor portion 100 opens the flat files and checks the content of the flat files. Then, in step S800, the preprocessor portion 100 processes the flat files. This processing includes outputting the flat files to the processed files memory 320. Then, the process passes to step S900. In step 900, the controller portion 400 outputs the files stored in the processed files memory 320 into a database as is necessary or desired.

Figure 4:
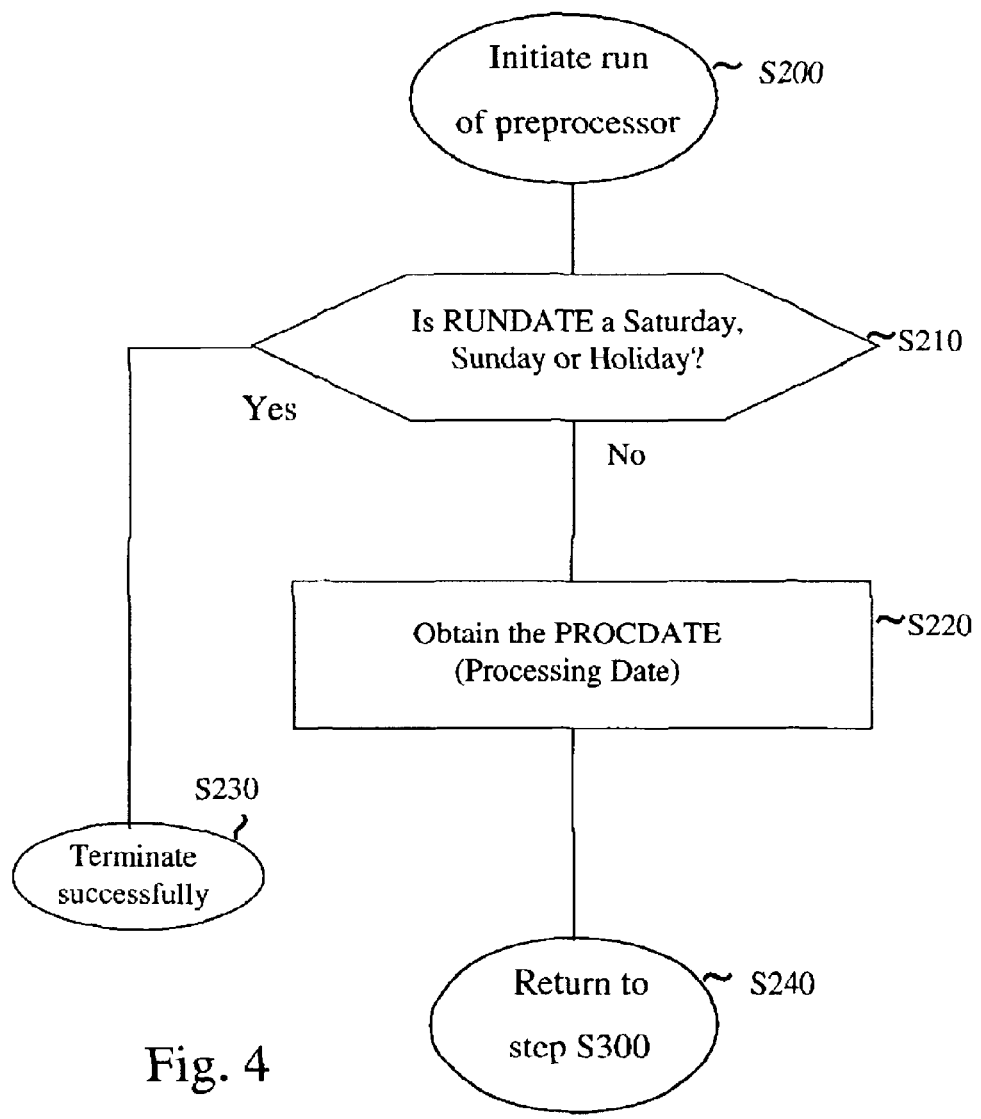
FIG. 4 is a flow chart showing in further detail the "initiate run of preprocessor" step of FIG. 3 in accordance with an embodiment of the method and system of the invention.

With reference to FIG. 4, the step of initiating the run of the preprocessor portion 100 will be described. As shown in FIG. 4, the initiate run of preprocessor step starts in step S200. Then, the process passes to step S210. In step S210, the preprocessor portion 100 determines the value of a variable RUNDATE. Specifically, the preprocessor portion 100 determines whether RUNDATE is a Saturday, Sunday or Holiday, for example. If the preprocessor portion 100 determines if the RUNDATE is a Saturday, Sunday or Holiday, then the process passes to step S230. In step S230, operation of the preprocessor portion 100 terminates successfully since no further processing is necessary on a Saturday, Sunday or Holiday. However, it should of course be appreciated that this is merely an illustrative example.

Alternatively, the preprocessor portion 100 may determine that the RUNDATE is not a Saturday, Sunday or Holiday. Then, the process passes to step S220 as shown in FIG. 4. In step S220, the preprocessor portion 100 obtains the PROCDATE, i.e., the processing date, in any suitable manner. For example, the PROCDATE may be the last business date prior to today. The PROCDATE may be derived in any suitable manner. Illustratively, the PROCDATE may be derived utilizing the logic:

```
PROCDATE = RUNDATE − 1 day
While (TRUE)
{
    if ( SUNDAY == PROCDATE ||
       SATURDAY == PROCDATE ||
       IsHoliday (PROCDATE) )
    {
       PROCDATE = PROCDATE − 1 day;
    }
    else
    {
       break;
    }
}
```

Further, as described below, the preprocessor portion 100 checks the processing date of the input files. Specifically, the preprocessor portion 100 checks that the processing date of the input files is the same as the PROCDATE. If the preprocessor portion 100 determines that the processing date of the input files is not the same as the PROCDATE, then those input files are treated as invalid. Illustratively, the PROCDATE may utilize the YYYYMMDD format.

After step S220, the process passes to step S240. In step S240, the process returns to step S300. Specifically, once the run of the preprocessor is initiated, the preprocessor portion 100 inputs the flat files. Input of the flat files may, for example, comprise retrieving the data of the flat files from the incoming files memory 310.

Figure 5:
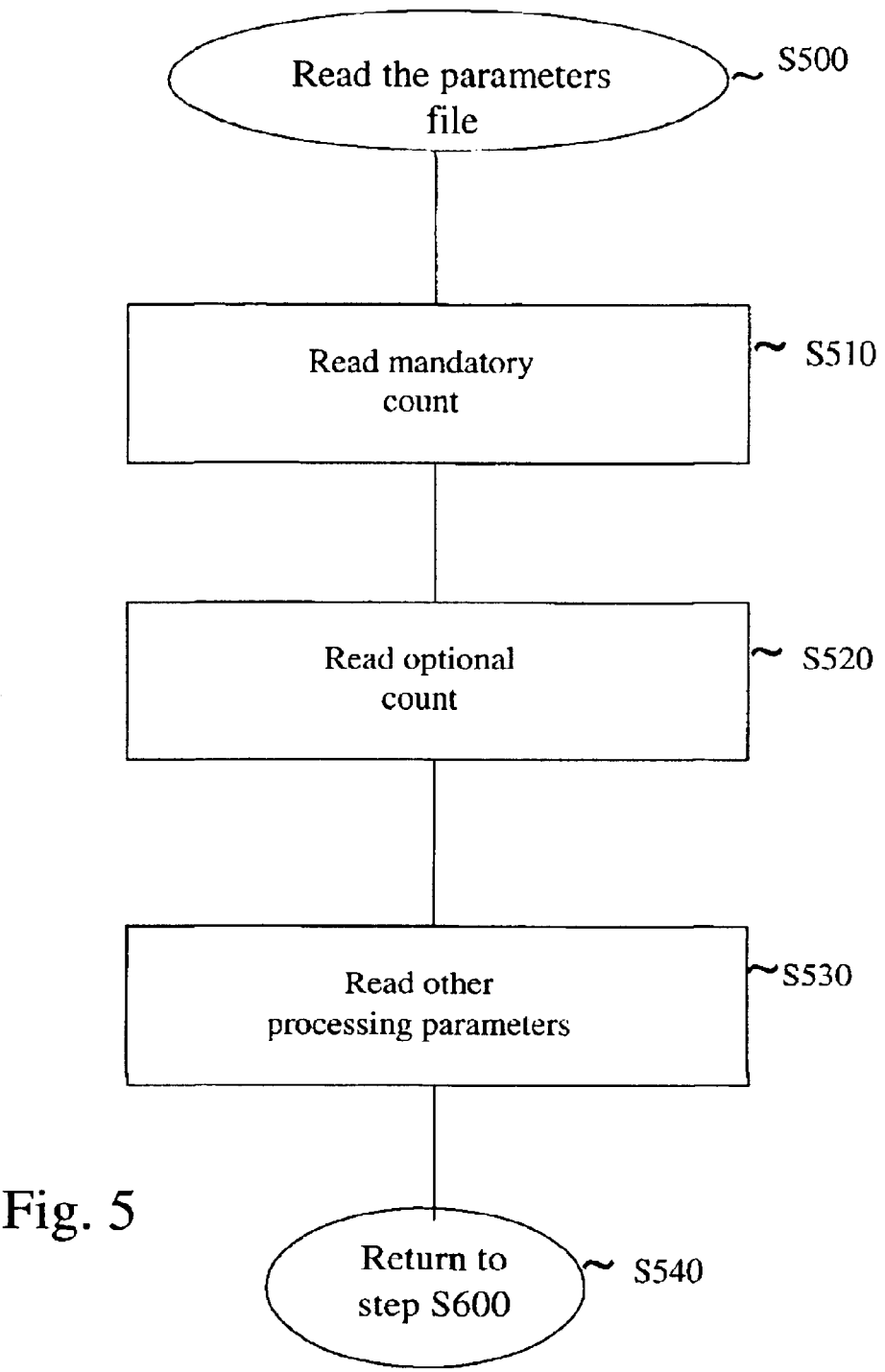
FIG. 5 is a flow chart showing in further detail the "read the parameters file" of FIG. 3 in accordance with an embodiment of the method and system of the invention.

Hereinafter, further aspects of the preprocessor portion 100 reading the parameters file will be discussed with reference to FIG. 5. FIG. 5 shows the process of reading the parameters file. The parameters file access portion 110 in the preprocessor portion 100 performs the reading of the parameters file. In accordance with one embodiment of the method and system of the invention, the parameters file is stored in the parameters file memory 315.

As shown in FIG. 5, the process performed by the parameters file access portion 110 of reading the parameters file from the parameters file memory 315 starts at step S500. Then, the process passes to step S510. In step S510, the parameters file access portion 110 reads the mandatory count, i.e., "MANDATORY COUNT" from the parameters file. Then, in step S520, the parameters file access portion 110 reads the optional count, i.e., "OPTIONAL COUNT" from the parameters file stored in the parameters file memory 315. The MANDATORY COUNT variable and OPTIONAL COUNT variable obtained from the parameters file inform the preprocessor portion 100 as to the number of mandatory and optional file details to be obtained from the incoming files.

While it should be appreciated that a variety of definition files may be used, in accordance with one embodiment of the method and system of the invention, the parameters file may be in the format of the following INI file as follows:

```
[INIT]
Folder=C:\TEMP        (Pick-up the mainframe output files from here)
Sleep time=15         (If all the expected files are not found, wait for
                       these many minutes before checking again)
Retries=3             (No. of sleep cycles to complete before paging an
                       alert for missing files and stopping the data upload process)
Archive=C:\ARCH       (Processed files to be archived in this directory
                       after loading into DB)
Logfile=C:\LOG        (Logfile of preprocessing to be kept in this folder)
Output=C:\temp\out    (Create data upload files used by SQL loader in
                       this folder)
Control=C:\temp\Cnt   (All SQL loader control files are kept here)
UserID=XXXXXXX        (UserID for ORACLE)
Password=XXXXXX       (Password for ORACLE)
Connect=XXXXX(Connect string for ORACLE)
Saratoga=C:\LOG       (Log file of Saratoga to be kept here)
[PAGER]
Host=3.47.28.21 (Host address)
Domain=gefa.capital.ge.com (Domain name)
MailTo=3145489@person.com (Pager mail id of the administrator)
MailFrom=name@company.com (Mail id of sender)
Subject=GEIS-STARS Preprocessor Fatal Error (Subject of mail)
Port=25 (Mail Port)
[STAGE2]
SQLdir=k:\dailyload\     (The directory where all the sql
```

-continued

| | |
|---|---|
| work | scripts necessary for upload are kept) |
| LSTdir=k:\dailylload\log | (The directory where all the output log is created |
| StepCount=39 | (number of steps in this stage) |
| BucketSQL=in_bkt.sql | |
| [S1] | |
| SQL=xxxxx.sql | |
| [S2] | |
| SQL=xxxxx.sql | |
| [S3] | |
| SQL=xxxxx.sql | |
| ............. | |
| [S39] | |
| SQL=xxxxx.sql | |
| [MANDATORY FILES] | |
| MandatoryCount=8 | (Total number of mandatory files. These many mandatory file detail sections are expected to follow in this file) |
| [M1] | (Details of first mandatory file) |
| Input=DFA.txt | (File name to read data from) |
| Output=DFA.DAT | (File to put data into for use by SQL loader) |
| Format=RC1 | (File format) |
| Control=DFA.CTL | (SQL loader control file) |
| Param=SILENT=TRUE | (Parameter string for SQL loader) |
| [M2] | (Details of second mandatory file) |
| . . . | |
| [M8] | (Details of eighth and final mandatory file) |
| . . . | |
| [OPTIONAL FILES] | |
| OptionalCount=3 | (Total number of optional files. These many mandatory file detail sections are expected to follow in this file) |
| [O1] | (Details of the first mandatory file) |
| Input=WRL.txt        (File name to read data from) | |
| Output=WRL.DAT | (File to put data into for SQL loader) |
| Format=RC1ACCUM | (File format) |
| Control= WRL.CTL | (SQL loader control file) |
| Param=SILENT=TRUE | (Parameter string for SQL loader) |
| [O2] | (Details of the second mandatory file) |
| . . . | |
| [O3] | (Details of the third and final mandatory file) |
| . . . | |
| [FILE FORMATS] | |
| FormatCount=4 | (The total number of input file formats. These many file format detail sections are expected to follow in this file) |
| [F1] | (Details of the first input file format) |
| Format=RC1 | (Format identifier) |
| Record width=161(160 plus newline) | |
| Header ID=RHR or 0 | (If header is absent then it is set to 0) |
| Header ID pos=3 or −1 | (If header is absent then it is −1 else it begins at pos = 3 in the first physical record of the file) |
| Procdate pos=37 or 0 | (Position in the first physical record of the file) |
| Procdate width=8 or 6 | (YYYYMMDD or YYMMDD) |
| Trailer ID=RTR or 0 | (If trailer is absent then it is set to 0) |
| Trailer ID pos=3 or −1 | (If trailer is absent then it is −1 else it begins at pos = 3 in the last physical record of the file) |
| Rec count pos=22 or −1 | (If trailer is absent then it is −1 else it begins at pos = 22 in the last physical record of the file) |
| Rec count width=8 or −1 | (If trailer is absent then it is −1 else it equals 8) |
| Processing req=Y or N | (RC1ACCUM requires no preprocessing) |
| Records=1100 | (Indicates that an output record includes the first two input records and excludes the last two input records) |
| Record index pos=4 | (Physical record index starts at position number 4) |
| Record index width=3 | (Physical record index cannot exceed 999) |
| [F2] | (Details of the second input file format) |
| . . . | |
| [F4] | (Details of the fourth and final input file format) |

It should be appreciated that the method of the invention allows for ease in adjusting the processing parameters of the preprocessor portion 100 in order to process input files of different format, i.e., files having a different format. Specifically, the parameters file, i.e., an INI file for example, allows a user to easily change both the mandatory and optional file details, as well as a variety of other operating or processing parameters. Accordingly, a user can process new input files without changing the preprocessor applica-tion program by simply changing the processing parameters in a suitable parameters file, which is stored in the parameters file memory 315, for example. In accordance with one embodiment of the methods and systems of the invention, the parameters file access portion may effect a change of the processing parameters in a parameters file. For example, a user may interface with the parameters file access portion, using a suitable user interface, in order to change processing parameters in a parameters file. For example, the interface portion 200 may provide such a suitable user interface.

Returning now to the flow charts, after step S520, the process passes to step S530. In step S530, the parameters file access portion 110 in the preprocessor portion 100 reads the other processing parameters. Further details of the preprocessor portion 100 reading the other parameters are described below. Then, the process passes to step S540 in which the process returns to step S600 as shown in FIG. 3.

Figure 6:
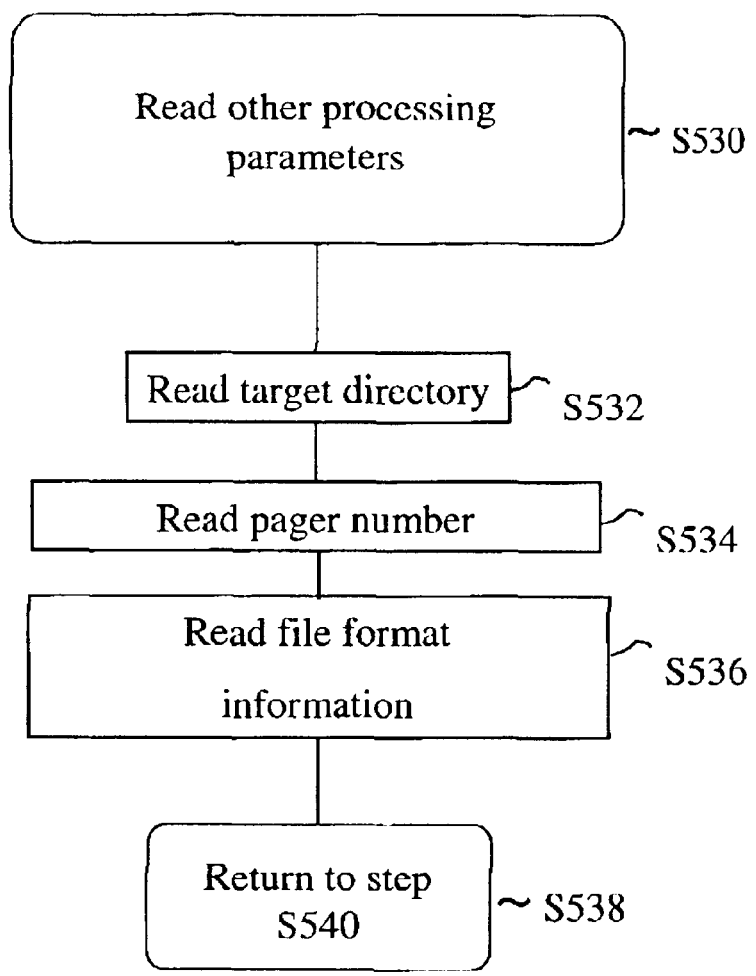
FIG. 6 is a flow chart showing in further detail the "read other processing parameters" step of FIG. 5 in accordance with an embodiment of the method and system of the invention.

FIG. 6 is a flowchart showing further details of the "read other processing parameters" step S530 of FIG. 5. That is, FIG. 6 shows further details of operations of the parameters file access portion 110 in accordance with one embodiment of the invention.

As shown in FIG. 6, the process starts in step S530. Then, the process passes to step S532. In step S532, the parameters file access portion 110 reads the target directory. The target directory is the directory which the processed files will ultimately be forwarded to. After step S532, the parameters file access portion 110 reads a pager number, for example, from the parameters file. The pager number identifies the person to be alerted if a problem arises with processing the input files. It should be appreciated that while a pager is illustratively used in this example, any suitable type of alert mechanism may be used in accordance with embodiments of the system and method of the invention. After step S534, the parameters file access portion 110 reads the file format information from the parameters file. After step S536, the process performed by the parameters file access portion 110 passes to step S538. In step S538, the process returns to step S540 in FIG. 5.

Figure 7:
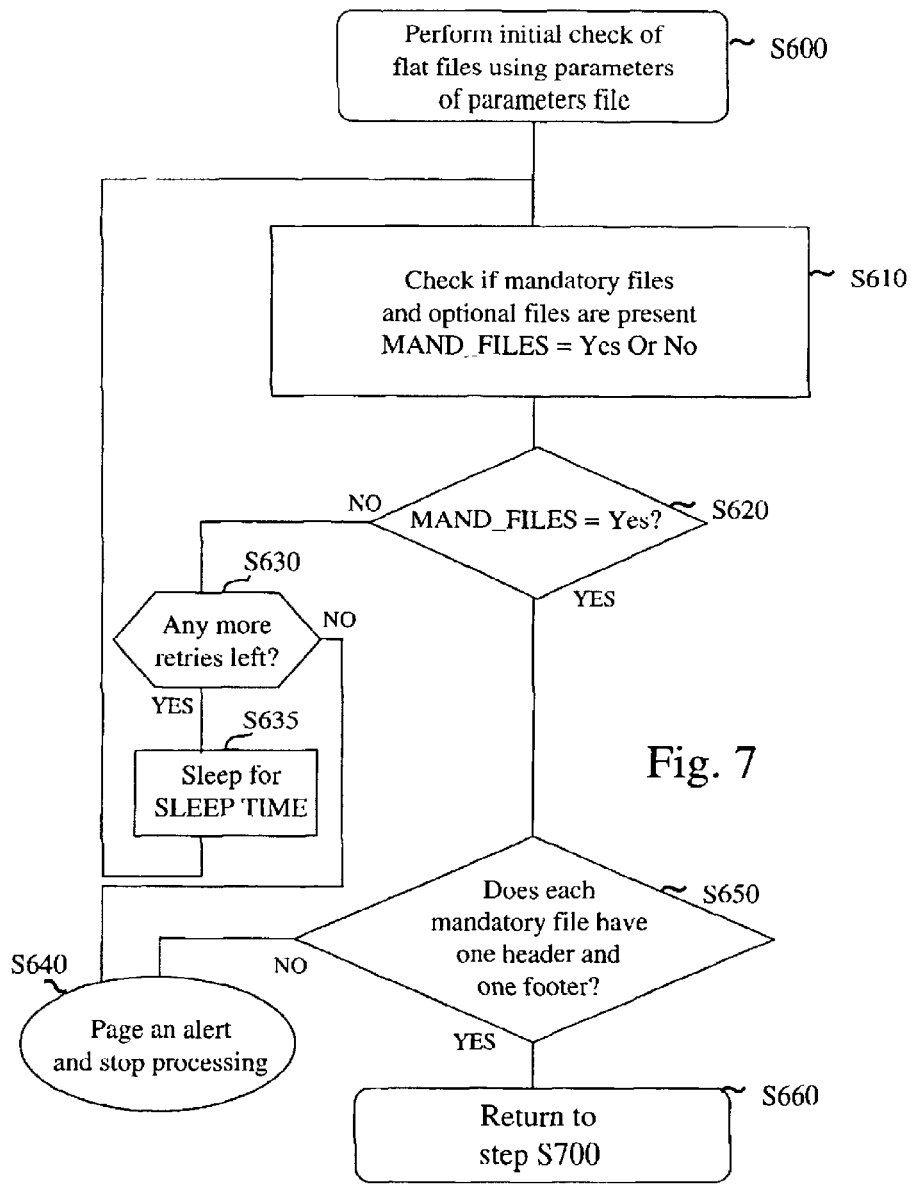
FIG. 7 is a flow chart showing in further detail the "perform initial check of flat files using parameters of parameters file" step of FIG. 3 in accordance with an embodiment of the method and system of the invention.

As shown in step S600 in FIG. 3, the preprocessor portion 100 performs an initial check of the input flat files using the parameters obtained from the parameters file in the parameters file memory 315. FIG. 7 illustrates further details of this initial check of the flat files in accordance with one embodiment of the method of the invention.

As shown in FIG. 7, the process of performing the initial check of the flat files using the processing parameters obtained from the parameters file begins in step S600. The check of the flat files is performed by the data checking portion 120 in the preprocessor portion 100. After step S600 as shown in FIG. 7, the process passes to step S610. In step S610, the data checking portion 120 checks if the mandatory files and optional files are present in the input files. That is, the parameters file access portion 110 checks if MAND FILES=YES or NO. Further details of checking the mandatory files and the optional files are described below with reference to FIG. 8.

As shown in FIG. 7, if the parameters file access portion 110 determines that the mandatory files are not present in step S620, the process then passes to step S630. It should be appreciated that the data checking portion 120 may have checked the input files prematurely, i.e., before all the input files have been uploaded successfully. As a result, the data checking portion 120 utilizes a "wait" or "sleep" period. This is a period of time that the data checking portion 120 allows for completion of inputting the flat files. Accordingly, in step S630, the data checking portion 120 determines if any more retries are left. If there are no more retries left, then the data checking portion 120 has already waited a predetermined number of times and will wait no longer. As a result, the process passes to step S640. In step S640, the data checking portion 120 pages an alert to an operator and stops processing of the input files.

As shown in step S640, the data checking portion 120 stops processing and pages and alert. That is, the data checking portion 120 may page a human operator to alert that operator that a deficiency exists with the input files. However, it should of course be appreciated that the operator may be alerted in any number of ways not limited to paging. For example, the operator may be alerted by e-mail or telephone, as an alternative to paging.

In step S630, as described above, the data checking portion 120 may determine that there are indeed more retries left. As a result, the process passes to step S635 as shown in FIG. 7. In step S635, the data checking portion 120 sleeps for a predetermined amount of time "SLEEP TIME." After the duration of the SLEEP TIME has expired, the process again passes back to step S610, as shown in FIG. 7. Accordingly, the data checking portion 120 will check once again whether all the mandatory files and optional files are present. In performing step S620 as shown in FIG. 7, the data checking portion 120 may determine that the mandatory files are all present, i.e., (MAND FILES=Yes). Then the process passes to step S650 as shown in FIG. 7 since all the mandatory files are present.

It should be appreciated by one of ordinary skill in the art that the mandatory files and optional files may vary widely based on the nature of the file and the desired use for those files. However, Table 1 below is an example of a collection of files that may be processed. As shown in Table 1, some files are mandatory files, while other files are optional files.
[t1]

TABLE 1

| S. No. | File | Mandatory | Format |
|---|---|---|---|
| 1. | RC1DATA | Y | RC1 |
| 2. | RC2DATA | Y | RC2 |
| 3. | RC3DATA | Y | RC3 |
| 4. | RCADATA | Y | RC3 |
| 5. | RC9DATA | Y | RC3 |
| 6. | RW1DATA | N | RC1AC CUMM |
| 7. | RCBDATA | N | RC2 |
| 8. | RCCDATA | N | RC1 |
| 9. | MISCELLANEOUS | N | |

Once the data checking portion 120 determines that all the mandatory files are present in the input files stored in the incoming file memory 310, the data checking portion 120 then checks the content of each mandatory file. Specifically, in step S650, the data checking portion 120 checks whether each mandatory file has one header and one footer. If the data checking portion 120 determines that each mandatory file does not have one header and one footer, then the process again passes to step S640 in which an alert is sent to a human operator.

Alternatively, the data checking portion 120 may determine that each mandatory file does indeed have one header and one footer. Accordingly, if YES in step S650, then the process passes to step S660. That is, the flat files are sufficiently complete to continue processing, even though it should be appreciated that all the optional files may actually not be present. In step S660, the preprocessor portion 100 returns to step S700 as shown in FIG. 3.

Figure 8:
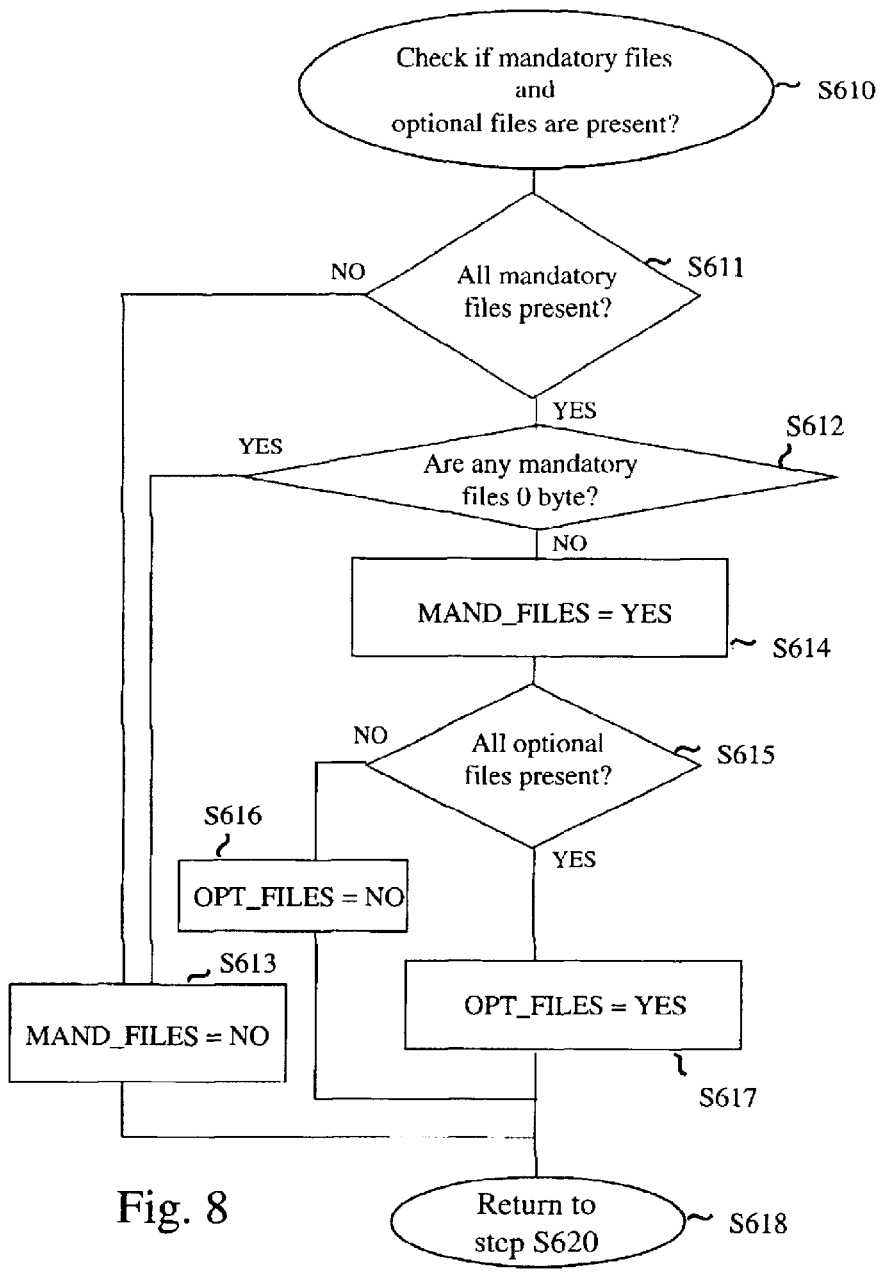
FIG. 8 is a flow chart showing in further detail the "check if mandatory files and optional files are present?" of FIG. 7 in accordance with an embodiment of the method and system of the invention.

FIG. 8 is a flow chart showing in further detail the step of checking if the mandatory files and optional files are present, which is performed by the data checking portion 120. As shown in FIG. 8, the process starts in step S610 and passes to step S611. In step S611, the data checking portion 120 determines if all the mandatory files are present. If no, then the process passes to step S613. In step S613, the data checking portion 120 assigns NO to the variable MAND___FILES. After step S613, the process passes to step S618 as shown in FIG. 8.

Alternatively, the data checking portion 120 may determine that all mandatory files are present in step S611. If so, then the data checking portion 120 performs step S612. In step S612, the data checking portion 120 checks whether any of the mandatory files are actually 0 byte files. That is, a 0 byte mandatory file is equivalent to the absence of a mandatory file and precludes further processing. Accordingly, in step S612 if the data checking portion 120 determines if a mandatory file is a 0 byte file, then the process passes to step S613. As described above, in step S613, the data checking portion 120 assigns a value of "NO" to the variable MAND FILES variable.

Alternatively, the data checking portion 120 may determine in step S612 that no mandatory files are 0 byte files. Then, the process passes to step S614. In step S614, the data checking portion 120 assigns a value of "YES" to the MAND FILES variable.

After step S614, the process passes to step S615. In step S615, the data checking portion 120 determines whether all optional files are present. If NO, i.e., the data checking portion 120 determines that all the optional files are not present, then the process passes to step S616. In step S616, the data checking portion 120 assigns a value of "NO" to the OPT___FILES variable. Alternatively, the data checking portion 120 may determine in step S615 that all optional files are present. As a result, the process passes to step S617 as shown in FIG. 8. In step S617, the data checking portion 120 assigns a value of "YES" to the OPT___FILES variable. After step S617, the process passes to step S618. In step S618, the process returns to step S620 as shown in FIG. 7.

Figure 9:
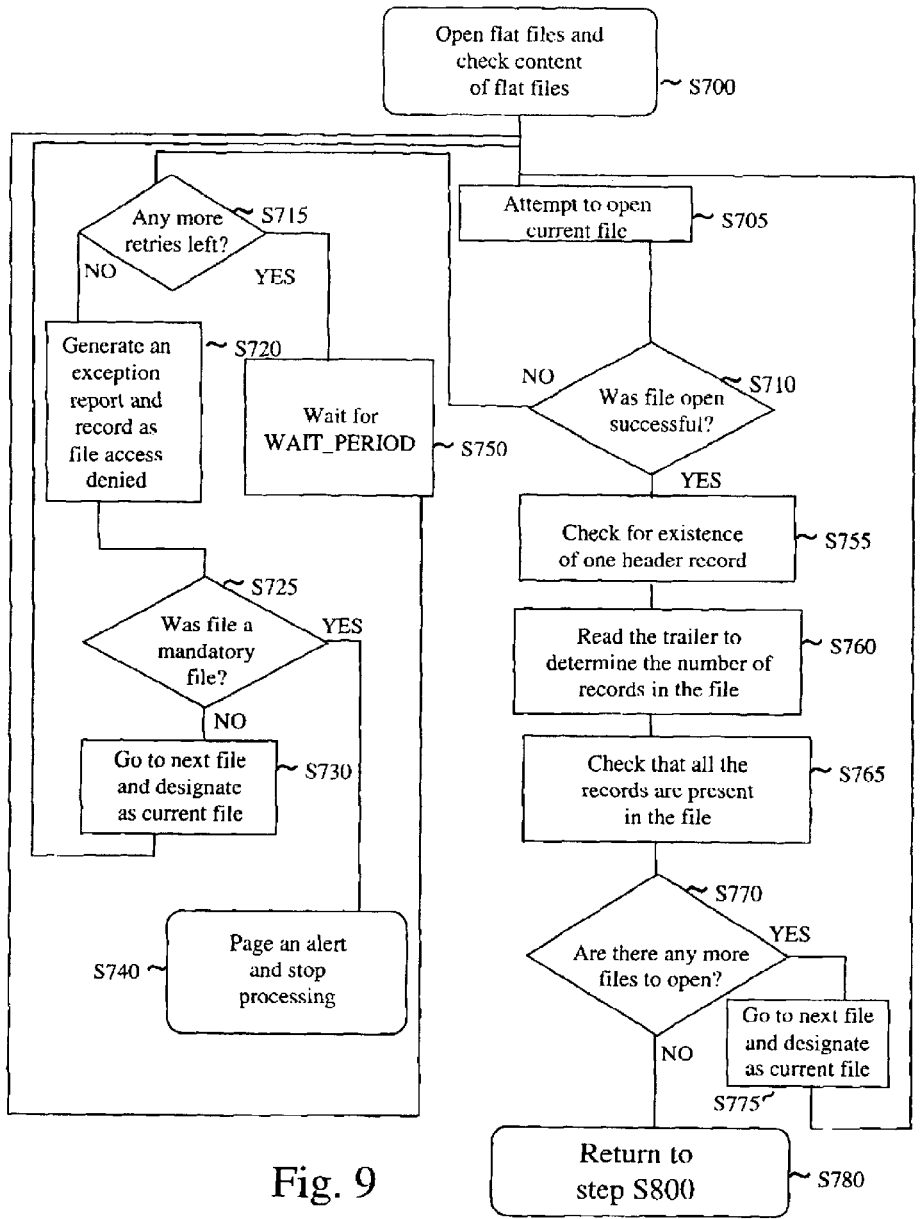
FIG. 9 is a flow chart showing in further detail the "open flat files and check content of flat files" step of FIG. 3 in accordance with an embodiment of the method and system of the invention.

FIG. 9 is a flow chart showing in further detail the "open flat files and check content of flat files" step S700, in further explanation of the high level flowchart shown in FIG. 3. FIG. 9 shows further operations perform by the data checking portion 120 in the preprocessor portion 100. As shown in FIG. 9, the process of opening and checking the flat files starts in step S700. Then, the process passes to step S705. In step S705, the data checking portion 120 attempts to open the current flat file. The first time that the process performs step S705, the "current file" is the first file. However, the data checking portion 120 may not be able to open the current file. For example, the file may be locked for some reason and as a result access to that file will be denied. Then, in step S710, the data checking portion 120 determines if the file open attempted in step S705 was successful. The data checking portion 120 may determine that the file open was not successful. As a result of the file open being unsuccessful, the process passes to step S715.

In step S715, the data checking portion 120 in the preprocessor portion 100 determines if there are any more retries left, i.e., if the data checking portion 120 will allow any more opportunities to open the current flat file. The data checking portion 120 may determine that no more retries are left. For example, if the access is denied to the current file after five such tries, the data checking portion 120 records the current file as a file access denied and an exception report is raised. Specifically, the process passes to step S720. In step S720, the data checking portion 120 generates an exception report and records the attempted access to the particular file as a "file access denied." After step S720, the process passes to step S725. In step S725, the data checking portion 120 determines whether the file which could not be opened was a mandatory file. If yes, i.e., the current file is a mandatory file, then the process passes to step S740. In step S740, the data checking portion 120 pages and alert to a human operator and stops processing. In other words, if the data checking portion 120 cannot open a mandatory file, then the data checking portion 120 will treat this condition generally the same as if the mandatory file was missing.

Alternatively, the data checking portion 120 may determine in step S725 that the file was not a mandatory file. As a result, the process passes to step S730. In step S730, the data checking portion 120 will advance to the next file and designate that next file as the current file. After step S730, the process again returns to step S705 in which the data checking portion 120 attempts to open the current file. If NO in step S710, i.e., the data checking portion 120 cannot open the current file, then the process again proceeds to step S715, as described above.

In step S715, the data checking portion 120 may determine that there are more retries left. As a result, the process passes to step S750 in which the data checking portion 120 waits for a WAIT_PERIOD. The wait period allows time for situations where operating conditions are temporarily disallowing the data checking portion 120 from opening the current file, such as a situation where another process is still writing into the file. The duration of the WAIT_PERIOD may be any desired amount of time. After the wait period in step S750, the data checking portion 120 again attempts to open the current file in step S705.

After step S705, the data checking portion 120 proceeds to step S710 to determine if the file open was indeed successful. The data checking portion 120 may determine that the file open was successful in step S710. If the file open was successful as determined in step S710, then the process passes to step S755. In step S755, the data checking portion 120 checks for the existence of one header record in the current file. Then in step S760, the data checking portion 120 reads the trailer in the file to determine the number of records in the current file. Then the process passes to step S765.

In step S765, the data checking portion 120 checks that all the records are present in the file based on the information in the trailer. Then in step S770, the data checking portion 120 determines whether there are any more files to open. If yes, i.e., there are more files to open, then the process passes to step S775. In step S775, the data checking portion 120 advances to the next file and designates that next file as the current file. After step S775, the data checking portion 120 returns to step S705 and proceeds with the new "current file" in the manner described above.

Alternatively, in step S770, the data checking portion 120 in the preprocessor portion 100 may determine that there are no more files to open. Then, the process passes to step S780. In step S780, the process returns to step S800 as shown in FIG. 3. That is, the process proceeds to step S800 in which the flat files are processed.

Figure 10:
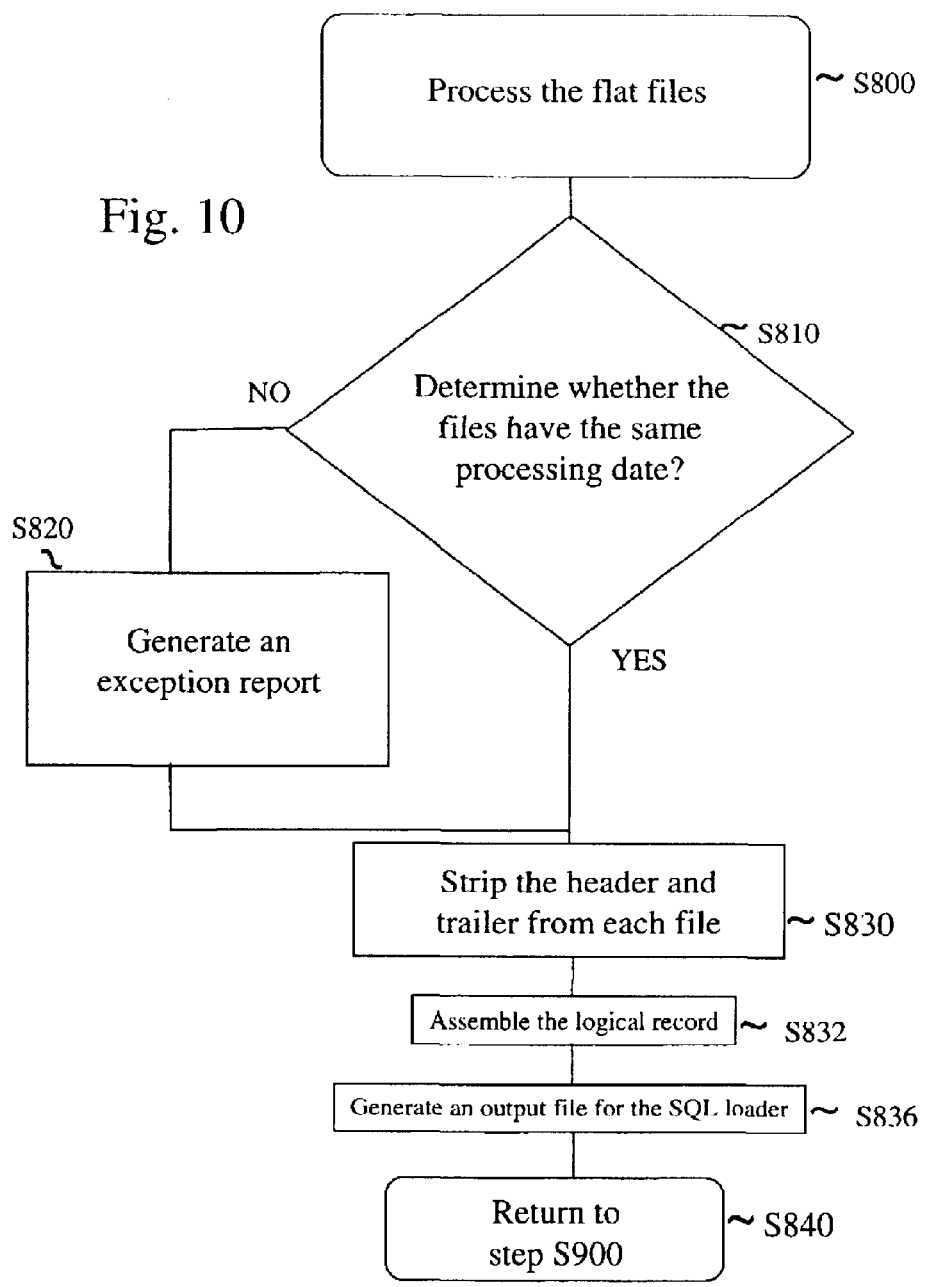
FIG. 10 is a flow chart showing in further detail the "process the flat files" step of FIG. 3 in accordance with an embodiment of the method and system of the invention.

FIG. 10 is a flow chart showing in further detail the step of processing the flat files. As shown in FIG. 10, the process starts in step S800 and then passes to step S810. In step S810, the preprocessor portion 100 determines whether the files have the same processing date, i.e., the same PROC-DATE. The processing date is determined by the preprocessor portion 100 as described above. If the files do not have the same processing date, then, as shown in step S820, the preprocessor portion 100 generates an exception report. For example, the exception report may be stored in a predetermined location or forwarded to a human user in some suitable manner. After step S820, the preprocessor portion 100 proceeds to step S830.

Alternatively, the preprocessor portion 100 may determine that the files do all have the same processing date. Then, the process passes directly to step S830. In step S830, the preprocessor portion 830 strips the header and trailer from each file. Then, the process passes to step S832 and control of the process passes to the logical record generation portion 130 in the preprocessor portion 100. In step S832, the logical record generation portion 130 assembles the logical record based on the input files. Specifically, the logical record generation portion 130 assembles the logical a record by processing the physical records. In the assembly of the logical record in accordance with one embodiment of the invention, any record with a sequence number not equal to "001" or "002" is ignored by the logical record generation portion 130, as is described further below. Further aspects of assembly of the logical record and operations of the logical record generation portion 130 are described below.

As shown in FIG. 10, after step S832, the process passes to step S836 and control of the process passes to the output file generation portion 140 in the preprocessor portion 100. In step S836, the output file generation portion 140 generates an output file for the SQL loader, in accordance with one illustrative embodiment of the method and system of the invention. That is, the output file generation portion 140 creates output files that are uploaded using a suitable SQL loader. These output files are uploaded into a temporary directory, i.e., into shadow tables in the processed files memory 320. The output files are text files. For example, the input files may be normalized, i.e., tables may be broken into smaller tables that are more manageable, in generation of the output files. In accordance with one illustrative embodiment of the system and method of the invention, the SQL load process is performed using all of the data input files.

The loading process may be monitored by the output file generation portion 140 for errors. If no errors are encountered in the SQL load process, then the output file generation portion 140 moves the data in the output files from the shadow tables to the main tables. That is, the output file generation portion 140 proceeds to step 5840 in FIG. 10 and, as a result, returns to step S900 in FIG. 3. In step S900, the output file generation portion 140 uploads the output files into a suitable database. The data in the shadow tables may be emptied into the main tables utilizing a suitable program such as PRO*C program.

It should be appreciated that in accordance with one embodiment of the method and system of the invention, the data of the files may be archived at any point in the processing. For example, after completion of the data loading by the SQL loading process, the output file generation portion 140 may save the files used in the SQL loading process in an ARCHIVE folder.

In accordance with one embodiment of the invention, all preprocessing activities performed by the preprocessor portion 100 are logged. That is, the log generation portion 140 in the preprocessor portion 100 logs preprocessing activities performed by the preprocessor portion 100. Specifically, the log generation portion 140 logs all preprocessing activities in a LOG FILE folder in the log memory 360 as shown in FIG. 2. The log may monitor a variety of activities of the preprocessor portion 100 including the initiation of preprocessing and the termination of preprocessing. For illustrative purposes, the log generated by the log generation portion 140 may be in the format as follows:

```
20010901 11:05:55: Log file started.
20010901 11:05:55: Initiating sleep cycle.
                   File not found - OPA. Sleep cycle number 0.
20010901 11:05:56: Initiating sleep cycle.
                   File not found - OPA. Sleep cycle number 1.
```
-continued
```
20010901 11:05:57: Initiating sleep cycle.
                   File not found - OPA. Sleep cycle number 2.
20010901 11:05:58: All sleep cycles completed.
                   File not found - OPA.
20010901 11:06:01: Log file stopped.
```

The first 20 characters of the log are taken up by the date (yyyymmdd HH:MM:SS) format, in accordance with one embodiment of the invention. For each activity, logged, the log generation portion 140 saves the date and time, followed by the main activity description. Subsidiary information is recorded on the next line that is aligned with the first column of the main activity line. The following Table 2 includes the main activity logged by the preprocessor:

[t2]

TABLE 2

| Activity code | Activity description | Subsidiary information |
|---|---|---|
| 0 | Log file started | None |
| 1 | Initiating sleep cycle | The missing [MANDATORY FILE NAME] and the sleep cycle number |
| 2 | All sleep cycles completed | The missing [MANDATORY FILE NAME] |
| 3 | Preprocessing [MANDATORY FILE NAME] | Problems encountered, e.g. missing header, missing trailer, incorrect file type, multiple header or trailer, missing records, incorrect PROCDATE |
| 4 | Finished preprocessing [MANDATORY FILE NAME] | Number of records found |
| 5 | Preprocessing [OPTIONAL FILE NAME] | Details of problems encountered |
| 6 | Finished preprocessing [OPTIONAL FILE NAME] file | Number of records found |
| 7 | Clear shadow tables | None |
| 8 | Upload data into shadow table DFA | Exceptions generated or not, number of records loaded |
| 9 | Upload data into shadow table OPA | Exceptions generated or not, number of records loaded |
| 10 | Upload data into shadow table APA | Exceptions generated or not, number of records loaded |
| 11 | Upload data into main tables | |
| 9999 | Log file closed | None |

As shown in Table 2, the log includes a variety of information. As shown in the activity code 3 item, for example, the log shows preprocessing specifics of particular mandatory files. Such specifics related to a particular mandatory file include any problems encountered in the processing of that mandatory file, including a missing header, a missing trailer, incorrect file type, multiple header or trailer, any missing records in that mandatory file, or an incorrect PROCDATE.

Further, activity code items 8–10 show further specifics of upload of the data. As shown in Table 2 the data is uploaded into three respective illustrative tables depending on the file. Specifically, the data is uploaded into a shadow table DFA (Direct Financial Activities), a shadow table OPA (Orders Processing/Activity), or a shadow table APA (Account Position Activity).

As described in the flowchart of FIG. 10 above, and specifically, step S832, the preprocessor portion 100 assembles a logical record. Hereinafter, further aspects of assembly of the logical record are described in accordance with one illustrative embodiment of the method and system of the invention. However, it should of course be appreciated that the assembly of the record is dependent on the specifics of the particular record being processed and, as a result, may be varied if processing files of different properties.

For each input file, the preprocessor portion 100 performs the preprocessing logic. Initially, the preprocessor portion 100 verifies that the file has a valid header. If the file does not have a valid header, then the preprocessor portion 100 raises a missing header exception. In accordance with this illustrative embodiment, the preprocessor portion 100 then reads characters 1–3 from the file. The first three characters should equal "RHR", for example, for a valid header record.

Thereafter, the preprocessor portion 100 checks the characters 30–37. These characters in the file represent the processed date of the file. As a result, these characters should equal the PROCDATE. Otherwise, the preprocessor portion 100 files an exception indicating an incorrect PROCDATE.

Then, the preprocessor portion 100 goes to the end of the current file being processed. There, the preprocessor portion 100 reads the last 161 characters of data. In these, the characters 1–3 should represent, for example, "RTR"; otherwise, a missing trailer is raised by the preprocessor portion 100 as an exception. Further, the characters 22–30 give the record count in the file. This information is saved as the records which are expected.

Thereafter, the preprocessor portion 100 reads the entire file, going through the characters 1–3 for each set of 161 characters. There should be only one "RHR" (record header) and one "RTR" (record trailer) in the entire file. Otherwise, the preprocessor portion 100 raises an exception "multiple headers" or "multiple trailers," as is applicable.

Then, the preprocessor portion 100 goes to the top of the file and skips 161 characters, i.e., the header record. The preprocessor portion 100 then sets the records read counter to 1 since records expected includes the header as well as the trailer. Then, the preprocessor portion 100 opens an output file in write mode.

The preprocessor portion 100 then reads the 161 characters. If characters 1–3 equal "RHR" or "RTR", the preprocessor portion 100 checks if this is not the last record. Then, the preprocessor portion 100, in this case, generates an exception for multiple header or trailer. The preprocessor portion 100 increments the records-read counter.

The preprocessor portion 100 reads characters 4–6. If characters 4–6 equal "001" and the temporary buffer used by the preprocessor portion 100 is not empty, then the preprocessor portion 100 writes the data to the output file. Thereafter, the preprocessor portion 100 proceeds each output record with the PROCDATE. Then, the preprocessor portion 100 flushes a temporary buffer.

If the preprocessor portion 100 determines that characters 4–6 do equal "001" or "002" then the preprocessor portion 100 writes the 161 characters into a temporary buffer. Otherwise, the preprocessor portion 100 reads the next 161 characters from the file, incrementing the record read counter. When the file is finished, the preprocessor portion 100 checks if records expected equals records read. If not, then the preprocessor portion 100 raises a "records not found" exception and deletes the output file.

As described above, the preprocessor portion 100 generates an exception report under a variety of circumstances. That is, the preprocessor portion 100 produces preprocessor exception reports for any critical problem which stops the creation of files required for loading of data. Illustratively, the preprocessor exception report includes the name of the feed file and the reason for the failure. The possible reasons for failure include missing header or trailer; multiple header or trailer; invalid file type; incorrect number of records found; or an incorrect PROCDATE, i.e., processing date.

As set forth below, Table 3 illustrates a variety of test conditions that might be utilized in the preprocessing of the input files. Table 3 includes the sequence number, test condition, action and expected results. The "test condition" is a particular situation observed by the preprocessor portion 100. The "action" is the particular operation that the preprocessor portion 100 performs upon observing the test condition. Further, the "expected results" is the result that is generally expected as a result of the test condition.

For example, with sequence number 1, the test condition is "INI file missing." If this test condition is observed, the preprocessor portion 100 is programmed to confirm that the parameters file, for example an INI file, is not in the same directory as the EXE file. Further, the expected results resulting from this test condition is that a fatal error is written in a log file in the same directory as the EXE file. The error is then paged, i.e., an operator is alerted to the problem by paging or in some other suitable manner. In other words, with respect to sequence number 1, the preprocessor portion 100 observes that there is no parameters file. As a result, the preprocessor portion 100 does not have instructions with respect to proceeding in its operations. As a result, an exception report is generated to alert the operator of this fatal error.

Accordingly, Table 3 includes various test conditions that may be observed. In sequence number 2, the test condition is that the output directories do not exist. If the output directory is not there, then the preprocessor does not have instructions with respect to what happens to the files. That is, the preprocessor portion 100 does not know where the data is stored or where the data is to be loaded. Various other test conditions are described in Table 3. These further test conditions are self-explanatory and, as a result, will not be described in further detail.

[t3]

| S. No. | Test Condition | Action | Expected Results |
|---|---|---|---|
| 1. | INI file missing | Make sure INI file is not there in the same directory as the EXE file | Fatal Error written in a log file in the same directory as EXE. The error is paged. |
| 2. | Output directories do not exist | Do not create these directories | Executable should create these directories. If it fails to create these directories, it is a fatal error situation. The executable should exit if output directories do not exist. |
| 3. | Input directories do not exist | Do not create these directories | It will be detected when access is made to files from these directories. It should be logged as a failed input file access problem. |

-continued

| S. No. | Test Condition | Action | Expected Results |
|---|---|---|---|
| 4. | Mandatory files not found in input directory | Delete a mandatory file | Poll for the missing file through the sleep cycles specified in the INI file. When all sleep cycles are expired, should record missing file in the log. |
| 5. | Optional file not found in not directory | Delete an optional file | It will not make any difference to the preprocessor since optional files may not be present every time. |
| 6. | Database down | Stop Oracle services from Control Panel. | Fatal error logged in logfile created as per location in INI file. Error logged is "Database error". Executable should stop after this. |
| 7. | Invalid procdate | Change the Procdate in the files | Invalid procdate reported in log file |
| 8. | Table tb_holiday does not exist | Drop this table | Should record a database error and exit. |
| 9. | Number of records found in a file do not match with the record count in the trailer | Change the number of records in the trailer | "Invalid number of records found" reported in log file |
| 10. | Repeated header | Insert a pair of header and trailer at the end of a datafile with wrong PROCDATE and record count = 2 | Check the PROCDATE in each header and stop at invalid PROCDATE even in the repeated header |
| 11. | Repeated trailer | Insert a pair of header and trailer at the end of a datafile with correct PROCDATE and record count = 2 | Accumulate the record count for each trailer and check the total number of records found = total of all the record counts in all the trailers |
| 12. | Repeated trailer | Insert a pair of header and trailer at the end of a datafile with correct PROCDATE and record count = 4 | Should detect invalid number of records |
| 13. | Size of records is less ? ? ? | Delete some of last characters in a record in any of the original NFDS files | Preprocessing stops. Error reported in log file. |
| 14. | Size of records is more ? ? ? | Insert some characters in a record in any of the original NFDS files | Preprocessing stops. Error reported in log file. |
| 15. | CTL/SQL files missing | Rename any CTL/SQL file | Fatal Error written in log file. |
| 16. | Sqlplus spool file not found | Give incorrect directory name in LSTdir variable in the INI file. | Fatal error written in log file. |
| 17. | Drop one or more shadow tables | Drop one or more shadow tables | Truncation or SQL load of shadow tables will fail and database error reported in log file. |
| 18. | Main table does not exist | Revoke privileges from any main table | Insert script will fail and database error reported in log file. |
| 19. | Non matching datatype of fields | Put a character in any number field in any of the NFDS files. | SQL Loader will fail and error reported in log file. |
| 20. | No privilege to insert/update | Revoke insert/update privilege from loaduser | SQL loader will fail and error reported in log file. |
| 21. | Database crash during loading | Shutdown immediate while loading | Fatal Error written in a log file. The error is paged. |
| 22. | Less space in tablespace during SQL load into shadow tables | Keep less value of maxextents of shadow tables. | Load error reported in log file. |
| 23. | User quota full during SQL load | Give less quota to loaduser | Load error reported in log file. |
| 24. | Two copies of the executable should not run | Run a second copy of the executable when the first is still running | The second copy should not run beyond the point of checking for an already running copy. |
| 25. | Restart should not repeat previous steps (checkpointing) | Create a text file chk.log in the directory from where the executable is to be run. Enter the following in the first line: 199811183000 where the first eight digits are today's date. Run the executable. | The preprocessing should skip polling for input files and preprocessing them. The first step should be to load into shadow tables using SQL loader. |
| 26. | Log file should be available even if the exe crashes in between | Run in debug mode and stop the execution after some logged steps. | The log file, though not complete, should have a record of the steps completed till termination. |
| 27. | Paging error should happen if a fatal error happens | 1. Delete a mandatory file<br>2. Have an incorrect procdate<br>3. Incorrect number or records<br>4. Load error<br>5. Move into main table error | Paging should happen. Currently being written in pagefile.txt in the same directory as the executable. |

-continued

| S. No. | Test Condition | Action | Expected Results |
|---|---|---|---|
| 28. | Saratoga should run if and only if the load into main tables was successful. | Make the main table load SQL script file unavailable. | Main load will be unsuccessful and Saratoga should not run |

As described above, an embodiment of the system of the invention as shown in FIGS. 1 and 2 is in the form of a computer or computer system. As used herein, the term "computer system" is to be understood to include at least one processor utilizing a memory or memories. The memory stores at least portions of an executable program code at one time or another during operation of the processor. Additionally, the processor executes various instructions included in that executable program code. An executable program code means a program in machine language that is able to run in a particular computer system environment to perform a particular task. The executable program code process data in response to commands by a user. As used herein, it will be appreciated that the term "executable program code" and term "software" mean substantially the same thing for the purposes of the description as used herein.

Further, it is to be appreciated that to practice the system and method of the invention, it is not necessary that the processor portions in the processing system 1000 and/or the memory be physically located in the same place. That is, it should be appreciated that each of the respective processor and the memory, or portions thereof, may be located in geographically distinct locations and connected so as to communicate in any suitable manner, such as over a network, for example. Additionally, it should be appreciated that each of the processor and/or the memory, in each of the respective operating components, may be composed of different physical pieces of equipment. Accordingly, it is not necessary that each processor be one single piece of equipment in one location and that the memory be another single piece of equipment in another location. That is, it is contemplated that a single processor may be two pieces of equipment in two different physical locations. The two distinct pieces of equipment may be connected in any suitable manner. Additionally, the memory may include two or more portions of memory in two or more physical locations. Further, the memory could include or utilize memory stores from the Internet, Intranet, Extranet, LAN or some other source or over some other network, as may be necessary or desired.

As described above, the invention may illustratively be embodied in the form of a computer or computer operating system. It is to be appreciated that the software that enables the computer operating system to perform the operations described above may be supplied on any of a wide variety of data holding media. Further, it should be appreciated that the implementation and operation of the invention may be in the form of computer code written in any suitable programming language, which provide instructions to the computer or computers, and that the code set forth above is merely illustrative.

It should further be appreciated that the software code or programming language that is utilized in a computer system to perform the above described invention may be provided in any of a wide variety of forms. Illustratively, the software may be provided in the form of machine language, assembly code, object code, or source language, as well as in other forms. Further, the software may be in the form of compressed or encrypted data utilizing an encryption algorithm.

Additionally, it should be appreciated that the particular medium utilized may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software used in practice of the invention may be provided in the form of a hard disk or be transmitted in some form using a direct telephone connection, the Internet, an Intranet, or a satellite transmission, for example. Further, the programming language enabling the system and method of the invention as described above may be utilized on all of the foregoing types of medium and any other medium by which software or executable program code may be communicated to and utilized by a computer or other operating system.

As described herein, the system and method of the invention may utilize an application program, a collection of separate application programs, a module of a program that is designed to handle, or a portion of a module of a program, for example. As noted above, it should be appreciated that the computer language used in the system and method of the invention may be any of a wide variety of programming languages. Further, it is not necessary that a single programming language be utilized in conjunction with the operation of the system and method of the invention. Rather, any number of different programming languages may be utilized as is necessary or desirable.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method of processing flat files for use in a relational database, the method comprising:
    inputting a plurality of flat files, each of the flat files containing data;
    accessing a parameters file to obtain processing parameters, the parameters file containing the processing parameters;
    checking the data in a plurality of the flat files based on the processing parameters;
    assembling a logical record by processing the data in the flat files based on the processing parameters; and
    generating an output file, the output file containing the logical record and a portion of the data; and
    wherein checking the data in the plurality of flat files includes checking a respective processing date of each flat file against a calculated processing date.

2. The method of claim 1, wherein the processing parameters includes mandatory file details and optional file details.

3. The method of claim 2, wherein checking the data in the plurality of flat files includes:
  checking if mandatory files are present based on the mandatory file details; and
  checking if optional files are present based on the optional file details.

4. The method of claim 3, wherein if all mandatory files are not present, then, the method further including:
  waiting for a predetermined time period; and
  rechecking for the mandatory files.

5. The method of claim 3, wherein checking the data in the plurality of flat files includes checking that each mandatory file has one header and one trailer.

6. The method of claim 1, wherein generating the output file includes normalizing the data.

7. The method of claim 1, further including changing at least one of the processing parameters in the parameters file, the changing being performed prior to accessing the parameters file.

8. The method of claim 1, wherein the processing parameters include at least one selected from the group consisting of a target directory, a pager number and file format information.

9. The method of claim 1, further including outputting the output file to a shadow table.

10. The method of claim 1, further including generating an exception report if a processing date of a flat file is inconsistent with the calculated processing date.

11. The method of claim 1, wherein processing the data in the flat files includes stripping the header and trailer from each flat file.

12. The method of claim 1, wherein the parameters file is an INI file.

13. The method of claim 1, wherein the logical record uses data from multiple physical records, the multiple physical records being generated from the data in the flat file.

14. A method of processing flat files for use in a relational database, the method comprising:
  inputting a plurality of flat files, each of the flat files containing data;
  providing a parameters file containing processing parameters;
  changing at least one of the processing parameters in the parameters file;
  accessing the parameters file to obtain the processing parameters, the processing parameters including mandatory file details and optional file details;
  checking the data in the plurality of the flat files based on the processing parameters, the checking including determining if mandatory files are present based on the mandatory file details and determining if optional files are present based on the optional file details, wherein if all mandatory files are not present, then, the method further including waiting for a predetermined time period and rechecking for the mandatory files;
  assembling a logical record by processing the data in the flat files based on the processing parameters; and
  generating an output file, the output file containing the logical record and a portion of the data.

15. The method of claim 14, wherein the processing parameters include at least one selected from the group consisting of a target directory, a pager number and file format information.

16. The method of claim 14, wherein checking the data in the plurality of flat files includes checking a respective processing date of each flat file against a calculated processing date.

17. The method of claim 14, wherein the parameters file is an INI file.

18. A system for processing flat files for use in a relational database, the system comprising:
  an input portion that inputs a plurality of flat files, each of the flat files containing data;
  a parameters file access portion that accesses a parameters file to obtain processing parameters, the parameters file containing the processing parameters;
  a data checking portion that checks the data in a plurality of the flat files based on the processing parameters;
  a logical record generation portion that assembles a logical record by processing the data in the flat files based on the processing parameters; and
  an output file generation portion that generates an output file, the output file containing the logical record and a portion of the data; and
  wherein the data checking portion that checks the data in a plurality of the flat files checks if mandatory files are present based on mandatory file details and checks if optional files are present based on optional file details.

19. The system of claim 18, wherein the processing parameters includes mandatory file details and optional file details.

20. The system of claim 18, wherein the parameters file access portion provides for changing at least one of the processing parameters in the parameters file.

21. The system of claim 20, wherein the parameters file access portion provides for a human user to change at least one of the processing parameters in the parameters file.

22. The system of claim 21, wherein the processing parameters include at least one selected from the group consisting of a target directory, a pager number and file format information.

23. The system of claim 18, wherein the data checking portion checks the data in the plurality of flat files by checking a respective processing date of each flat file against a calculated processing date.

24. The system of claim 23, wherein the data checking portion generates an exception report if a processing date of a flat file is inconsistent with the calculated processing date.

25. The system of claim 18, wherein the processing of the data in the flat files performed by the logical record generation portion includes stripping the header and trailer from each flat file.

26. The system of claim 18, wherein the parameters file is an INI file.

27. A system for processing flat files for use in a relational database, the system comprising:
  an input portion that inputs a plurality of flat files, each of the flat files containing data;
  a parameters file memory that contains a parameters file, the parameters file containing processing parameters, the processing parameters including mandatory file details and optional file details;
  a parameters file access portion that accesses the parameters file to obtain the processing parameters, the parameters file access portion providing for a user of the system to change the processing parameters;
  a data checking portion that checks the data in a plurality of the flat files based on the processing parameters, the data checking portion checking if mandatory files are present based on the mandatory file details and checking if optional files are present based on the optional file details;

a logical record generation portion that assembles a logical record by processing the data in the flat files based on the processing parameters; and an output file generation portion that generates an output file, the output file containing the logical record and a portion of the data.

28. The system of claim 27, wherein the processing parameters include at least one selected from the group consisting of a target directory, a pager number and file format information.

29. The system of claim 27, wherein the parameters file is an INI file.

30. A system for processing flat files for use in a relational database, the system comprising:

means for inputting a plurality of flat files, each of the flat files containing data;

means for accessing a parameters file to obtain processing parameters, the parameters file containing the processing parameters;

means for checking the data in a plurality of the flat files based on the processing parameters;

means for assembling a logical record by processing the data in the flat files based on the processing parameters; and means for generating an output file, the output file containing the logical record and a portion of the data; and wherein checking the data in the plurality of flat files includes checking a respective processing date of each flat file against a calculated processing date.

31. A system of processing flat files for use in a relational database, the system comprising:

means for inputting a plurality of flat files, each of the flat files containing data;

means for providing a parameters file containing processing parameters;

means for changing at least one of the processing parameters in the parameters file;

means for accessing the parameters file to obtain the processing parameters, the processing parameters including mandatory file details and optional file details;

means for checking the data in the plurality of the flat files based on the processing parameters, the checking including determining if mandatory files are present based on the mandatory file details and determining if optional files are present based on the optional file details, wherein if all mandatory files are not present, then, the method further including waiting for a predetermined time period and rechecking for the mandatory files;

means for assembling a logical record by processing the data in the flat files based on the processing parameters; and means for generating an output file, the output file containing the logical record and a portion of the data.

* * * * *